UNITED STATES PATENT OFFICE 2,545,095

POLYACYLATED AMINO DIOLS

Loren M. Long, Grosse Pointe Woods, and Harvey D. Troutman, Ferndale, Mich., assignors to Parke, Davis & Company, Detroit, Mich., a corporation of Michigan No Drawing. Application January 21, 1950, Serial No. 139,959

7 Claims. (Cl. 260—487)

This application is a continuation in part of our co-pending application, Serial Number 83,770, filed March 26, 1949, now U. S. Patent No. 2,516,130, issued July 25, 1950, and the invention relates to new chemical compounds and to chemical methods useful for their synthesis. More particularly, the invention relates to a new class of polyacylated amino diols and to methods for obtaining these products. The polyacylated amino diols of the invention have the formula,

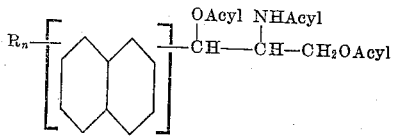

where $n$ is 1 or 2 and R is the same or different and represents hydrogen, halogen, nitro, lower alkyl, or lower alkoxy radicals. The term "acyl" as used herein includes such acyl radicals as saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" (reg.) series or form and to the trans diastereoisomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula is to be interpreted in its generic sense, that is, as representing the (l)-$\psi$, (d)-$\psi$, (l)-reg. or (d)-reg. isomers in separated form as well as the (dl)-$\psi$ or the (dl)-reg. optical racemates or the total unresolved mixture of structural and optical isomers. Such a formula does not merely represent the unresolved mixture of isomers.

In accordance with the invention, the polyacylated amino diols of the above general formula are produced by acylating the compounds of the formula,

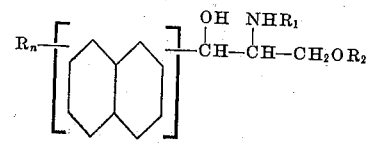

where $R_1$ and $R_2$ are the same or different and represent hydrogen or acyl radicals, and R and $n$ have the same significance as given above. As acylating agents either acyl halides or acyl anhydrides can be used. The acylating agents which are preferably employed under substantially anhydrous conditions can be used alone or in conjunction with alkaline catalysts such as alkali or alkaline earth metal hydroxides, carbonates and oxides, tertiary amines and the like. Some specific examples of suitable alkaline catalysts are sodium hydroxide, potassium hydroxide, lithium hydroxide, barium hydroxide, potassium carbonate, calcium oxide, pyridine, dimethylaniline, N-ethyl piperidine, N-ethyl morpholine, quinoline, triethylamine and the like. In general, when no alkaline catalyst is employed, the reactants must be heated together in order to bring about the reaction in a reasonable time. In most instances a heating period of several hours suffices. When an alkaline catalyst is employed, heating is usually not necessary as the reaction proceeds with sufficient rapidity at moderate temperatures, that is, below about 50° C. In some instances, however, where the acyl halide or anhydride is not particularly reactive, it is advantageous to carry out the reaction at a temperature above about 50° C.

This acylation process can also be carried out in an aqueous medium. This is most conveniently accomplished by using a two-phase reaction mixture, that is, one consisting of water and a water-immiscible organic solvent, such as ethyl acetate, ether, chloroform and ethylene dichloride. In such a case it is preferable to carry out the reaction at about 25° C. or below and to employ a weakly alkaline material in conjunction with the acyl halide or anhydride. Some examples of the weakly alkaline catalysts which can be used are calcium carbonate, magnesium carbonate, barium carbonate and the like.

As pointed out above, the amino diols of the invention and their acylated derivatives can exist in structural as well as optical isomeric forms. Where a particular optical isomeric form or optical racemate of one of the two structural forms of these products is desired, it is necessary to separate the unresolved amino diol or acylated amino diol into its two component structural isomers. This is accomplished quite readily and completely by utilization of the differences in solubility of the two forms in water, organic solvents or in water-organic solvent mixtures. Some of the organic solvents which can be used in this fractional crystallization or solubilization are lower aliphatic alcohols, acetone, chloroform, ethyl acetate and the like. In some cases, the solvent solubility differential of the two forms is not great enough to afford a clean-cut separation of the two structural isomers and in these cases it is preferable to convert the isomer mixture of the free amino diol or acylated amino diol into another acylated derivative of the amino diol whose structural isomers differ more markedly in their solubility characteristics. The structural isomers of this new acylated amino diol can then be separated by fractional crystallization and the appropriate structural form of the product so obtained converted either by acylation or hydrolysis to the desired structural form of the free amino diol or acylated amino diol.

Where a particular optical isomer of the amino diol or acylated derivative thereof is desired the corresponding individual regular or pseudo structural form of the 1-naphthyl-2-aminopropane-1,3-diol is resolved into its optical isomers via an optically active acid addition salt. This resolution which must be carried out on the free amino diol is performed by forming an acid addition salt of the racemic amine with an optically active acid such as (d)-tartaric, (l)-tartaric, (d)-mandelic, (l)-mandelic, (d)-bromcamphor sulfonic, (l)-bromcamphor sulfonic, (d)-camphor sulfonic and (l)-camphor sulfonic, separating the two isomeric salts by recrystallization from a solvent such as a lower aliphatic alcohol or mixtures of the same with water or other organic solvents and then regenerating the individual optical isomers from the separated optically active acid addition salts by neutralizing each one separately. When carrying out this resolution it is desirable, but not absolutely necessary, to choose the form of the optically active acid so that the desired optical isomer will separate from the crystallization solution first.

The polyacylated amino diol compounds of the invention are valuable intermediates for the preparation of other organic compounds. They are of particular value as intermediates for the preparation of organic compounds possessing antibiotic activity.

The invention is illustrated by the following examples:

*Example 1*

3 g. of (dl) - $\psi$ - 1 - (4 - nitro - 1 - naphthyl) - 2-aminopropane-1,3-diol is added to a mixture composed of 6 cc. of acetic anhydride and 6 cc. of dry pyridine, and the resulting mixture heated at 100° C. for about one-half hour. The reaction mixture is evaporated to dryness in vacuo and the residue recrystallized from methanol to obtain the desired (dl)-$\psi$-1-(4-nitro-1-naphthyl)-2-acetamido-1,3-diacetoxypropane of the formula,

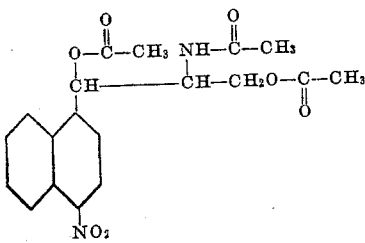

(dl)-$\psi$ Form

*Example 2*

1.5 g. of (dl) - $\psi$ - 1 - (4 - nitro - 1 - naphthyl) - 2 - acetamido - 3 - acetoxypropane - 1 - ol is added to a mixture composed of 3 cc. of acetic anhydride and 3 cc. of dry pyridine and the resulting mixture heated at 100° C. for one-half hour. The reaction mixture is evaporated to dryness in vacuo and the residue recrystallized from ethanol to obtain the desired (dl)-$\psi$-1-(4-nitro-1 - naphthyl) - 2 - acetamido - 1,3 - diacetoxypropane. This product is identical in all respects with the product obtained by the procedure outlined in Example 1.

*Example 3*

5 g. of (dl)-$\psi$-1-(4-nitro-1-naphthyl)-2-dichloroacetamidopropane-1,3-diol is added to a mixture composed to 10 cc. of acetic anhydride and 10 cc. of dry pyridine and the resulting mixture heated at 100° C. for three-quarters of an hour. The reaction mixture is evaporated to dryness in vacuo and the residue recrystallized from ethanol to obtain the desired (dl)-$\psi$-1-(4-nitro - 1 - naphthyl) - 2 - dichloroacetamido-1,3-diacetoxypropane of the formula,

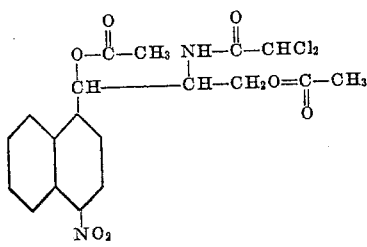

(dl)-$\psi$ Form

Example 4

1.8 g. of (dl)-ψ-1-(4-nitro-1-naphthyl)-2-dichloroacetamido - 3 - dichloroacetoxypropane-1-ol is added to a mixture composed of 4 g. of dichloroacetic anhydride and 3 cc. of dry pyridine and the resulting mixture heated at 100° C. for one hour. The reaction mixture is evaporated to dryness in vacuo and the residue recrystallized from ethanol to obtain the desired (dl)-ψ-1 - (4 - nitro - 1 - naphthyl) - 2 - dichloroacetamido-1,3-bis(dichloroacetoxy)propane of the formula,

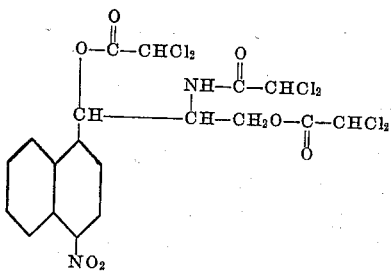

(dl)-ψ Form

Example 5

3 g. of (dl)-reg.-1-(6-chloro-2-naphthyl)-2-phenylacetamido - 3 - cyanoacetoxypropane - 1-ol is added to 5 cc. of dry pyridine and the solution cooled to 0° C. 2 g. of benzoyl chloride is added and the solution is allowed to stand for one hour. The reaction mixture is diluted with water, extracted with ethyl acetate and the extract washed successively with dilute hydrochloric acid, sodium bicarbonate solution and water. The ethyl acetate extract is dried and the ethyl acetate distilled in vacuo to obtain the crystalline (dl)-reg.-1-(6-chloro-2-naphthyl)-2-phenylacetamido -3 - cyanoacetoxy - 1 - benzoyloxypropane of the formula,

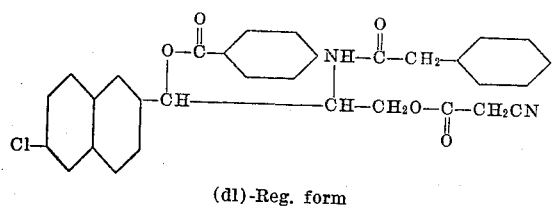

(dl)-Reg. form

Example 6

1.5 g. of (l)-ψ-1-(8-methyl-1-naphthyl)-2-aminopropane-1,3-diol is added to 10 cc. of dry pyridine and the solution cooled to 0° C. 5 g. of p-toluyl chloride is added and the solution allowed to stand for two hours. The reaction mixture is diluted with water, extracted with ethyl acetate and the extract washed successively with dilute hydrochloric acid, sodium bicarbonate solution and water. The ethyl acetate extract is dried and the ethyl acetate distilled in vacuo to obtain the crystalline (l)-ψ-1-(8-methyl - 1 - naphthyl - 2 - p - toluylamido - 1,3-bis-(p-toluyloxy) propane of formula,

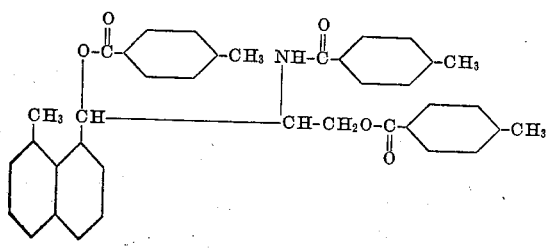

(l)-ψ Form

Example 7

3 g. of (d)-reg.-1-(3,6-dimethoxy-1-naphthyl)-2-nicotinamidopropane-1,3-diol is heated at 75° C. for one hour with a mixture consisting of 10 cc. of dry pyridine and 5 cc. of methoxyacetic anhydride. The reaction mixture is evaporated to dryness in vacuo, the residue taken up in water, extracted with ethyl acetate and the ethyl acetate layer washed with dilute hydrochloric acid, dilute sodium bicarbonate solution and water. The extract is dried, the ethyl acetate distilled and the residue recrystallized from ethanol. The product thus obtained is the bis-(methoxyacetate) of (d)-reg.-1-(3,6-dimethoxy-1 - naphthyl) - 2 - nicotinamidopropane - 1,3-diol of formula,

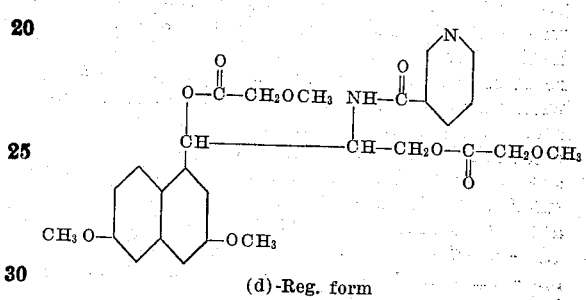

(d)-Reg. form

Example 8

2.32 g. of (dl)-reg.-1-(5-iodo-1-naphthyl)-2-aminopropane-1,3-diol in 10 cc. of dry pyridine is treated with 4 g. of succinic anhydride and the mixture heated on a steam bath for one hour. The solution is cooled, diluted with 100 cc. of 2 N hydrochloric acid and extracted with ethyl acetate. The ethyl acetate extract is washed with acidified water (pH 4) and finally with 60 cc. of 0.5 N sodium carbonate solution. The pH of the alkaline wash is brought to 2 with 2 N hydrochloric acid and the crystalline precipitate collected. This product is the tri-half-succinoyl derivative of (dl)-reg.-1-(5-iodo-1-naphthyl)-2-aminopropane-1,3-diol of the formula,

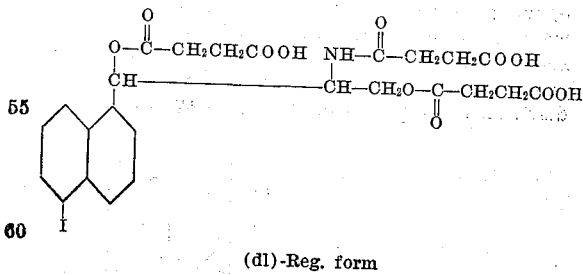

(dl)-Reg. form

Example 9

2 g. of (dl)-ψ-1-(6-ethyl-2-naphthyl)-2-lactamidopropane-1,3-diol or the corresponding acetyllactamido derivative is heated at 85° C. with a mixture consisting of 10 cc. of dry pyridine and 6 cc. of acetic anhydride for one and one-half hours. The liquids are evaporated in vacuo, the gummy residue taken up in ether and washed successively with dilute hydrochloric acid, sodium bicarbonate solution, and water. The ether extract is dried, the ether evaporated and the residue recrystallized from ether-petroleum ether mixture to obtain the pure (dl)-ψ-1-(6-ethyl-2-naphthyl)-2-acetyllactamido-1,3-diacetoxypropane of the formula,

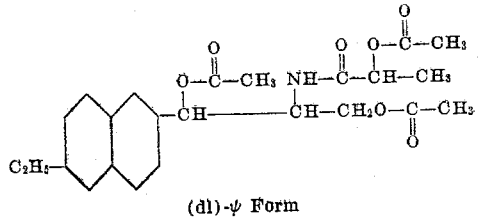

(dl)-ψ Form

Example 10

4 g. of (d)-ψ-1-(7-methoxy-1-naphthyl)-2-β,β-dimethylacrylamido-3-acetoxyacetoxypropane-1-ol in 10 cc. of dry pyridine is heated with 4 g. of furoic anhydride and the solution heated for two hours on a steam bath. The reaction mixture is diluted with water, extracted with ethyl acetate, and the extract is washed successively with dilute hydrochloric acid, sodium bicarbonate solution and water. The ethyl acetate extract is dried, the ethyl acetate distilled and the residue crystallized from ethyl acetate-methanol mixture to obtain the desired (d)-ψ-1-(7-methoxy-1-naphthyl)-2-β,β-dimethylacrylamido-3-acetoxyacetoxy-1-furoyloxypropane of the formula,

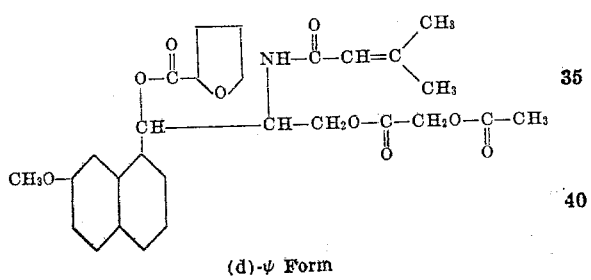

(d)-ψ Form

Example 11

4 g. of (l)-reg.-1-(5-bromo-2-naphthyl)-2-bromoacetamido-3-propionyloxypropane-1-ol in 10 cc. of pyridine is treated with 5 g. nicotinoyl chloride at 0° C. for one hour. The reaction mixture is diluted with water, extracted with ethyl acetate and the ethyl acetate extract washed successively with dilute hydrochloric acid, sodium bicarbonate solution and water. The ethyl acetate layer is dried and the ethyl acetate distilled in vacuo to obtain the desired (l)-reg.-1-(5-bromo-2-naphthyl)-2-bromoacetamido-3-propionyloxy-1-nicotinoyloxypropane of the formula,

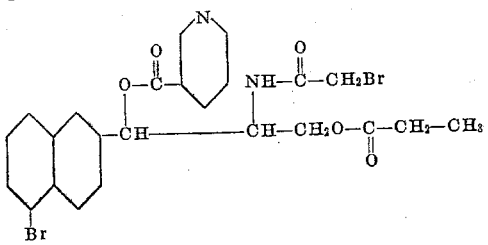

(l)-Reg. form

Example 12

5 g. of (dl)-ψ-1-(1-naphthyl)-2-acetamido-3-acetoxypropane-1-ol is treated with 5 g. of acetic anhydride in 10 ml. of dry pyridine. The mixture is heated at 60° C. for two hours and is then diluted with water, extracted with ethyl acetate and the ethyl acetate extract washed successively with dilute hydrochloric acid, sodium bicarbonate solution and water. The organic layer is dried and the ethyl acetate distilled in vacuo to obtain (dl)-ψ-(1-naphthyl)-2-acetamido-1,3-diacetoxypropane of the formula,

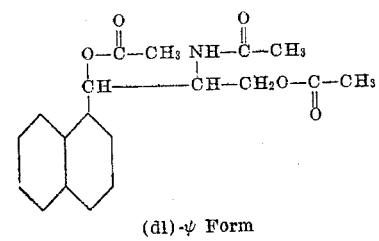

(dl)-ψ Form

In the foregoing examples we have employed as starting materials products having the formula,

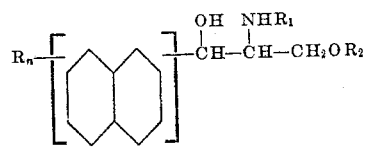

where R and n have the same significance as given above and R₁ and R₂ are the same or different and represent hydrogen or acyl radicals. These starting materials can be prepared in a number of different ways. One of the general methods which can be used to prepare the compounds of the type depicted above is that represented by the following diagram:

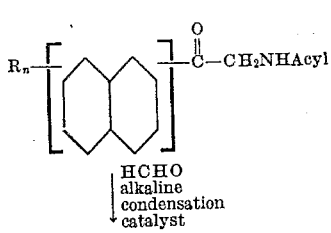

HCHO
alkaline condensation
catalyst

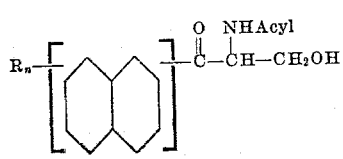

reduction and separation via fractional crystallization

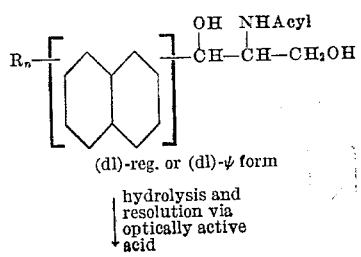

(dl)-reg. or (dl)-ψ form hydrolysis and resolution via optically active acid

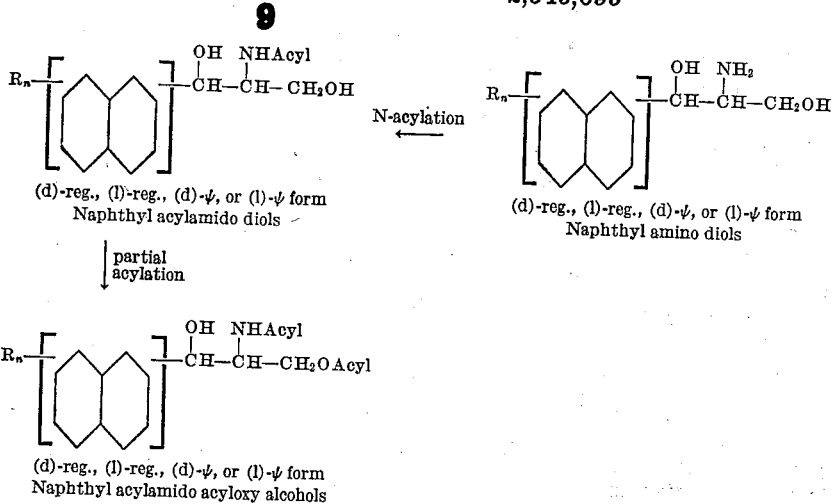

where R and n have the same significance as given above. The preparation of the unresolved starting materials has not been shown in the above diagram but these products may be prepared by the indicated processes by omitting the steps of separating the structural and optical isomers. The following examples serve to illustrate the application of this method to the preparation of some of the specific starting materials used in the foregoing examples.

(a) 60 g. of 1-naphthyl acetamidomethyl ketone is mixed with 300 cc. of methanol and 75 cc. of 40% formalin. 2 g. of sodium bicarbonate is added and the mixture stirred at room temperature for about one hour during which time the desired product separates. The insoluble 1-naphthyl α-acetamido-β-hydroxyethyl ketone of formula,

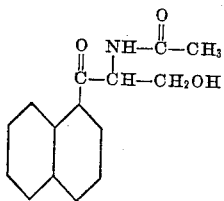

is collected and purified by recrystallization from ethyl acetate.

(b) A mixture consisting of 53 g. of 1-naphthyl α-acetamido-β-hydroxyethyl ketone, 75 g. of aluminum isopropylate and 1 liter of isopropanol is heated under reflux in an atmosphere of nitrogen for about five hours. During the refluxing period the acetone which has formed is distilled off from the mixture under reduced pressure and the residue treated with about 1 liter of water. The mixture is heated to boiling to insure complete precipitation of the aluminum hydroxide, filtered while hot and the filtrate allowed to cool. The (dl)-ψ-1-(1-naphthyl)-2-acetamidopropane-1,3-diol which separates from the cooled solution is collected by filtration and purified by recrystallization from dilute ethanol. The formula of this product is,

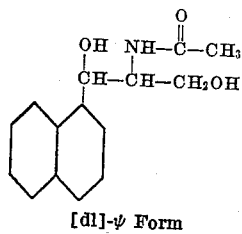

[dl]-ψ Form

If desired, additional quantities of the (dl)-ψ-structural isomer and also the corresponding (dl)-reg.-1-(1-naphthyl)-2-acetamidopropane-1,3-diol may be recovered from the aqueous filtrates by saturation of the filtrate with salt, exhaustive extraction with ethyl acetate and followed by distillation of the ethyl acetate from the extract. The residue which consists of a mixture of the two structural forms is separated by crystallization from water or dilute ethanol.

(c) 25 g. of (dl)-ψ-1-(1-naphthyl)-2-acetamidopropane-1,3-diol is heated with 600 cc. of 5% hydrochloric acid for twelve hours. The reaction mixture is cooled and the hydrochloride salt of (dl)-ψ-1-(1-naphthyl)-2-aminopropane-1,3-diol which separates collected and washed with a small amount of water. The hydrochloride salt thus obtained is dissolved in water or suspended therein and the mixture treated with an excess of concentrated ammonium hydroxide. The (dl)-ψ-1-(1-naphthyl)-2-aminopropane-1,3-diol free base which separates is collected, washed with a small amount of water and purified by recrystallization from water. The formula of this product is,

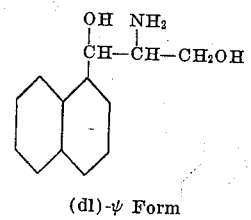

(dl)-ψ Form (d) 5 g. of (dl)-ψ-1-(1-naphthyl)-2-aminopropane-1,3-diol is dissolved in a minimum amount of water containing a small amount of methanol and the resulting solution treated with an aqueous solution containing an equivalent amount of (d)-tartaric acid. The solution is evaporated to dryness in vacuo and the residue fractionally crystallized from a minimum amount of hot methanol. The first isomer to separate from the solution in crystalline form is the (d)-tartaric acid salt of (l)-ψ-1-(1-naphthyl)-2-aminopropane-1,3-diol. The (d)-tartaric acid salt of (d)-ψ-1-(1-naphthyl)-2-aminopropane-1,3-diol is recovered from the filtrates after removal of the salt of the (l) isomer.

The (d)-tartaric acid salt of (l)-ψ-1-(1-naphthyl)-2-aminopropane-1,3-diol obtained above is dissolved in water, the solution made alkaline to pH 9 with sodium hydroxide solution and the precipitated (l)-ψ-1-(1-naphthyl)-2-aminopropane- 1,3-diol free base collected. The formula of this product is,

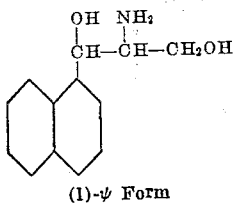

(l)-ψ Form

By decomposing the (d)-tartaric acid salt of (d)-ψ-1-(1-naphthyl)-2-aminopropane-1,3-diol in the same manner as described above for the (l)-isomer one obtains the free base of (d)-ψ-1-(1-naphthyl)-2-aminopropane-1,3-diol. If desired, the (d)-tartaric acid used above may be replaced with (d)-camphor sulfonic acid. In this instance it is preferable to use a reaction mixture consisting of isopropanol or n-butanol rather than the methanol used in the fractional recrystallization of the tartrate salts.

(e) 3 g. of (l)-ψ-1-(1-naphthyl)-2-aminopropane-1,3-diol is heated with about 10 cc. of methyl dichloroacetate on a steam bath for one-half hour. The reaction mixture is evaporated to dryness in vacuo and the residue recrystallized from water to obtain the desired (l)-ψ-1-(1-naphthyl)-2-dichloroacetamidopropane-1,3-diol of formula,

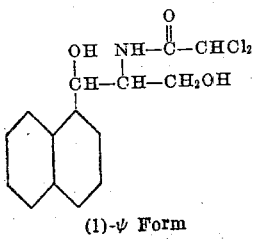

(l)-ψ Form (f) 4 g. of (dl)-ψ-1-(1-naphthyl)-2-aminopropane-1,3-diol is heated with 10 cc. of methyl dichloroacetate on a steam bath for about one-half hour. The reaction mixture is evaporated to dryness in vacuo and the residue recrystallized from water to obtain the desired (dl)-ψ-1-(1-naphthyl)-2-dichloroacetamidopropane-1,3-diol. This product has the formula,

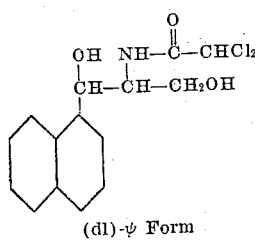

(dl)-ψ Form (g) 4 g. of (dl)-ψ-1-(1-naphthyl)-2-aminopropane-1,3-diol is heated with an excess of acetic anhydride at 70° C. for fifteen minutes. The reaction mixture is evaporated to dryness in vacuo and the residue recrystallized from ethanol. The white crystalline product thus obtained is (dl)-ψ-1-(1-naphthyl)-2-acetamido-3-acetoxypropane-1-ol of formula,

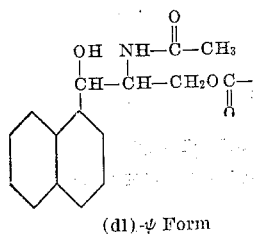

(dl)-ψ Form

What we claim is:
1. A compound of formula,

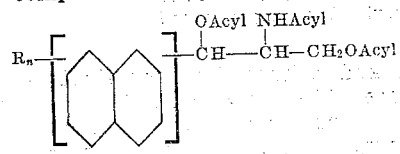

where $n$ is one of the integers 1 and 2 and R is a member of the class consisting of hydrogen, halogen, nitro, lower alkyl and lower alkoxy radicals.

2. A compound of formula,

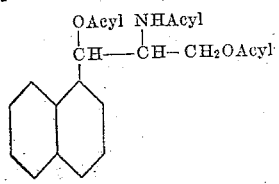

3. (dl)-ψ-1-(1-naphthyl)-2-acetamido-1,3-diacetoxypropane.

4. A compound of formula,

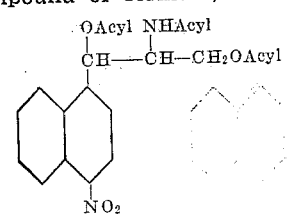

5. (dl)-ψ-1-(4-nitro-1-naphthyl)-2-acetamido-1,3-diacetoxypropane.

6. (dl)-ψ-1-(4-nitro-1-naphthyl)-2-dichloroacetamido-1,3-diacetoxypropane.

7. (dl)-ψ-1-(4-nitro-1-naphthyl)-2-dichloroacetamido-1,3-bis(dichloroacetoxy)propane.

LOREN M. LONG.
HARVEY D. TROUTMAN.

No references cited.